(No Model.)
F. GROTE.
DIRT SCRAPER.
No. 606,540. Patented June 28, 1898.
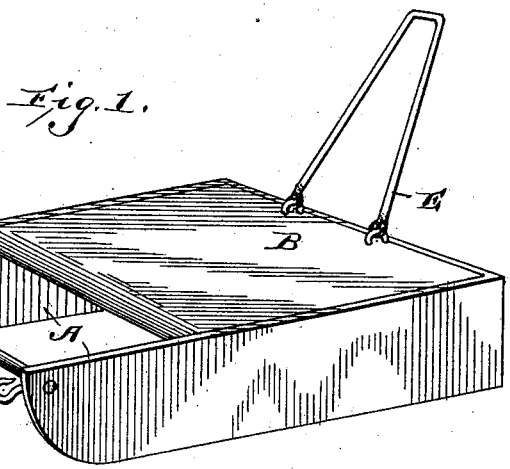
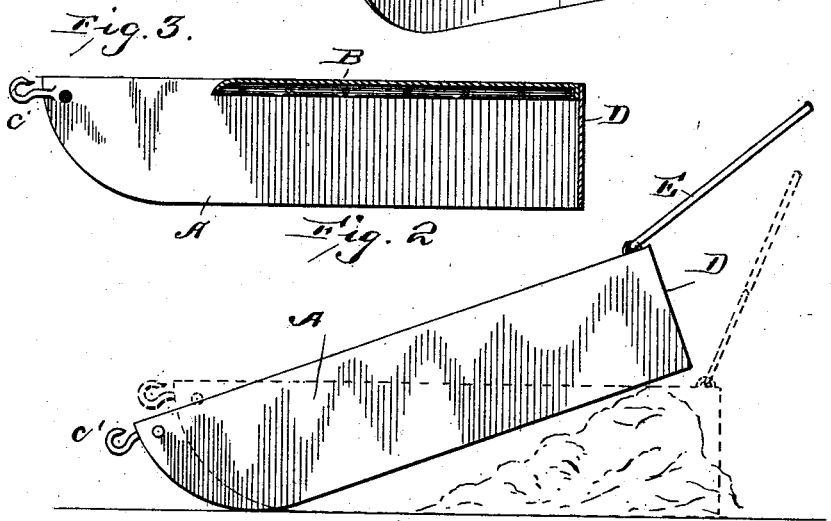
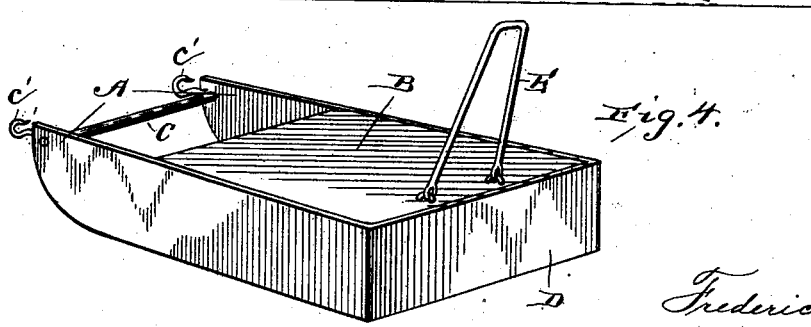
Witnesses
Frederick Grote
Inventor
By Edson Bros.
his Attorneys.

UNITED STATES PATENT OFFICE.

FREDERICK GROTE, OF HUNTINGBURG, INDIANA.

DIRT-SCRAPER.

SPECIFICATION forming part of Letters Patent No. 606,540, dated June 28, 1898.

Application filed November 2, 1897. Serial No. 657,194. (No model.)

*To all whom it may concern:*

Be it known that I, FREDERICK GROTE, a citizen of the United States, residing at Huntingburg, in the county of Dubois and State of Indiana, have invented certain new and useful Improvements in Dirt-Scrapers; and I do hereby declare the following to be a full, clear, and exact description of the invention, such as will enable others skilled in the art to which it appertains to make and use the same.

The invention relates to an improvement in dirt or manure scrapers; and it comprises a device adapted to be drawn by any draft-animal and the accumulated dirt, manure, &c., carried along over the surface of the ground and discharged at the will of the operator or driver of the animal.

The object of the invention is to provide a thorough and effective scraper which shall be simple in construction, convenient and effective in use, and which will be cheap and inexpensive. This result is attained by the construction hereinafter described, and illustrated in the accompanying drawings, forming a part of this specification, and on which—

Figure 1 is a perspective view showing the structure and manner of using the invention. Fig. 2 illustrates the manner of discharging the dirt or manure which has been accumulated by the scraper. Fig. 3 is a vertical longitudinal section through the device, and Fig. 4 is a perspective view showing the rear thereof.

Referring again to the drawings, on which like letters of reference indicate corresponding parts in the different views, A A are the runners or side supports by means of which the device is moved along over the surface to be scraped or cleaned, and these runners have the general form of sled-runners, and, in fact, the entire structure is somewhat similar to any ordinary sled.

B is the top or cover, underneath which the dirt or manure is collected. It is a plain plate or board extending from one of the runners to the other at the rear end and extends forward toward the front a suitable distance, somewhat after the fashion of the top or seat of a sled. At the front end, arranged transversely, is a rod or bar C, which extends from one runner to the other, preferably a little below the top edges thereof. At the rear of the scraper is a vertical plate or wall D, which extends from one of the runners to the other and is connected or formed as a part continuous of the top B. When formed as a part of the top—if made of metal, for example—it is either bent at right angles thereto or otherwise constructed to bear this relation to the top. The lower edge of the part or plate D may be sharpened, if desired.

At the front ends of the runners are hooks or analogous means, to which the draft-animal is to be hitched, or a single or double tree may be connected to the bar or rod c' for the same purpose.

A rigid or flexible lift or handle E is secured to the rear of the top B, so that by the use of the same the accumulated scrapings may be discharged at the will of the driver or operator. It will be seen that a pull on the handle against the shaft will lift the scraper bodily and leave the scrapings deposited at any desired point. The scraper may also be tilted by the use of the handle in a manner that will be readily apparent—viz., by tilting or lifting the rear thereof. The lower edge of the top B in front may also be bent or formed with a depending flange of suitable width, so that, if desired, the scraper may be turned over or upside down and the gathered dirt, &c., thus be carried to any desired place of deposit.

From the foregoing description the mode of operating or using the scraper will be readily apparent and needs no further description.

Having thus fully described the invention, what I claim as new, and desire to secure by Letters Patent, is—

A road or dirt scraper, comprising two sides or runners, a top or cover, a vertical scraper at its rear end, a depending vertical flange at its front end, a lift or handle, means at the front ends for attaching a draft-animal and a rod, or stay, extending transversely from one rod to the other in front, substantially as described.

In testimony whereof I affix my signature in presence of two witnesses.

FREDERICK GROTE.

Witnesses:
WALLIS L. SMITH,
THOMAS LIVERMORE.